Aug. 23, 1938.  L. E. LA BRIE  2,127,739

BRAKE

Original Filed April 23, 1931

INVENTOR.
LUDGER E. LA BRIE
BY
ATTORNEY

Patented Aug. 23, 1938

2,127,739

UNITED STATES PATENT OFFICE 2,127,739

BRAKE

Ludger E. La Brie, South Bend, Ind., assignor to Bendix Brake Company, South Bend, Ind., a corporation of Illinois Original application April 23, 1931, Serial No. 532,265. Divided and this application July 9, 1934, Serial No. 734,249

29 Claims. (Cl. 188—106)

This invention relates to brakes, and is illustrated as embodied in a novel type of shiftable-anchorage automobile brake.

One feature of the invention relates to arranging for fluid-pressure application a brake of the type having a pair of floating or individually-shiftable shoes, i. e., arranged to shift individually from one anchor to another so that both shoes have self-energizing characteristics in both directions of drum rotation. Preferably there are two fluid-pressure operators adjacent the opposite ends of the shoes, and these operators in the forms illustrated in themselves embody a number of important features of novelty.

An important feature of the invention relates to eliminating shifting of the shoes on forward application, preferably by using a piston at the toe of each shoe which is larger in diameter than the piston at the heel, so that the return springs will hold the heels of the two shoes continuously anchored in forward application, although permitting the toes of the shoes to shift into engagement with the anchors on reverse application.

Another very important feature relates to a novel duplex mechanical applying device, described as connected to the usual emergency or hand lever but equally capable of use as a service connection operated by the pedal. When used as an emergency connection, I prefer to associate with this mechanical applying device two novel hydraulic actuating cylinders, the whole being arranged in a novel and compact manner.

This mechanical applying device, whether operated by the emergency hand lever or by the service pedal or by some equivalent means, in itself embodies substantial novelty, especially in the simple and effective arrangement of the brake which it greatly facilitates. In the arrangement illustrated, it includes a lever or the like associated with and arranged adjacent each of the two anchors, and each for example having thrust lugs or other means acting on the corresponding shoe ends on opposite sides of the anchor. These levers are arranged to shift with the shoe ends as the shoes shift their anchorage.

The levers or their equivalents may have associated therewith parts, shown as but not necessarily being integral extensions of the levers, paralleling each other and extending approximately perpendicular to the brake diameter which extends between and through the two anchors, and which are operated by a connection extending across the brake. I prefer to arrange this connection so that it may shift sufficiently to balance the applying forces acting on the two levers.

I prefer to house the above-described novel brake between the drum and backing plate of the brake, arranged to form a substantially closed brake chamber for that purpose. The above-mentioned connection is then operated by means operable from outside of that chamber.

In the illustrated brake, this connection is in turn connected to a cable or the like extending through the backing plate, and the part of which outside of the backing plate is housed in a flexible conduit engaging a tubular extension or the like formed on the backing plate. In this arrangement the conduit in effect forms a flexible extension of the brake chamber, and may extend to the vehicle frame.

The above and other objects and features of the invention, including various novel combinations of parts and desirable particular combinations, will be apparent from the following description of the illustrative embodiment shown in the accompanying drawing, in which.

Figure 1:
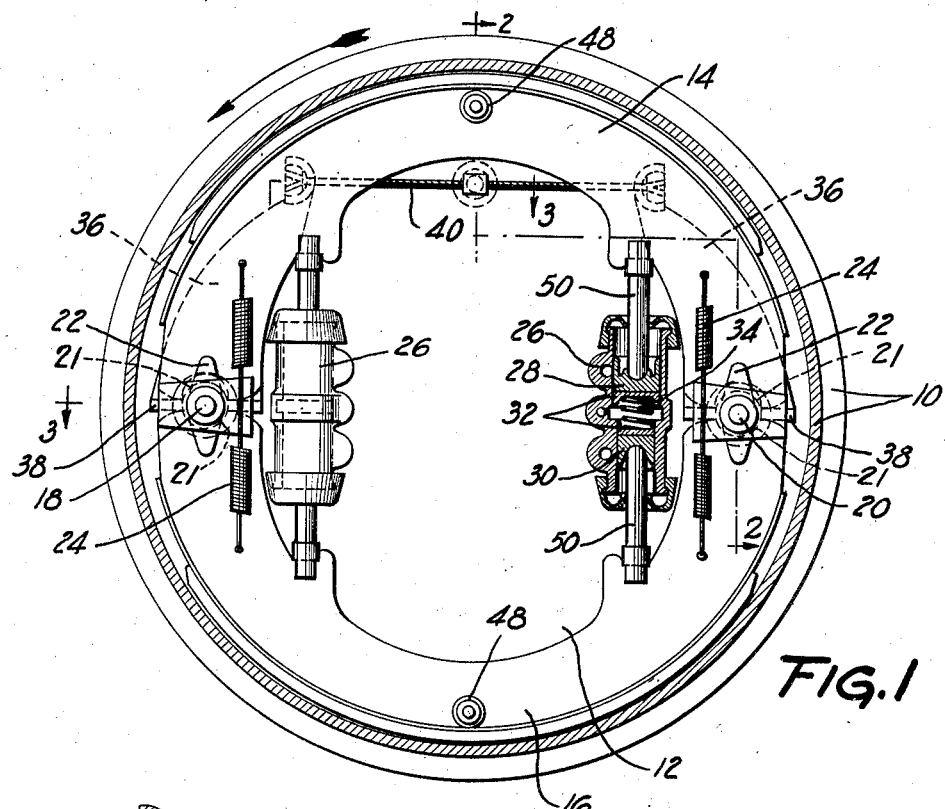
Figure 1 is a vertical section through a combination mechanical-hydraulic brake of the type described above, just inside the head of the brake drum, and showing the brake shoes in side elevation.
Figures 2, 3:
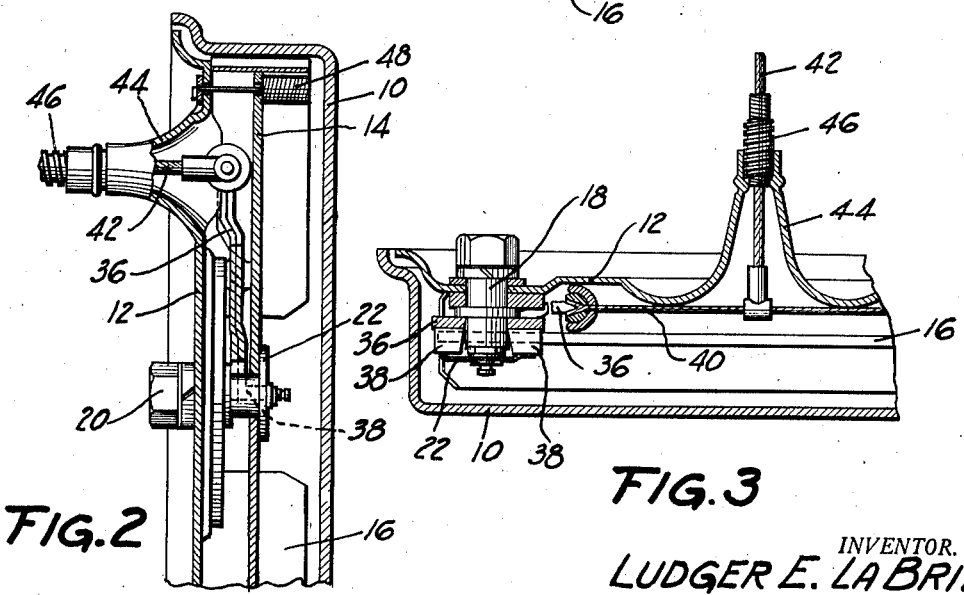
Figure 2 is a partial section on the line 2—2 of Figure 1, showing the mechanical operating means.
Figure 3 is a section, at right angles to Figure 2, on the line 3—3 of Figure 1, and also showing the mechanical operating means.

In the brake of Figures 1, 2 and 3, there is a rotatable drum 10, at the open side of which is a support such as a novel backing plate 12, and within which is arranged the brake friction means which in this case comprises a pair of floating and individually-shiftable shoes 14 and 16. The brake is provided at opposite sides with a pair of anchorages for the shoe ends, shown as a pair of anchor posts 18 and 20 carried by the backing plate and seated in notches 21 in the ends of the shoes and provided with elongated retaining washers 22 engaging the sides of the shoes to hold them laterally (see especially Figure 3). Return springs 24 are tensioned between the shoes at their opposite ends. When the brake is released, the notches 21, due to their rounded form, serve as centering means for centering the shoes as the return springs 24 urge them against the anchors 18 and 20.

The brake is applied by novel fluid-pressure means, which in this embodiment includes a pair of hydraulic wheel cylinders 26 secured to the backing plate adjacent each anchorage, and within each of which is arranged a relatively large-diameter piston 28 acting on the toe of one of the shoes (i. e., on the part of the shoe which leaves the anchorage during forward braking) and a relatively smaller-diameter piston 30 acting on the heel of the other shoe (i. e., on the part of the shoe which remains anchored on forward braking). The pistons may have suitable rubber packing cups 32, shown held by a light spring 34 compressed between them.

By this arrangement, since the springs 24 pull equally on the two shoes, and since the larger-diameter pistons 28 thrust outwardly with more power than the smaller-diameter pistons 30, with any given fluid pressure in the line and in the cylinders 26 between the pistons, the pistons 30 do not operate to shift the heels of the shoes away from their anchors at any time during forward braking, but merely move far enough to follow the shoes as shoe 14 pivots on anchor 18 and shoe 16 pivots on anchor 20. Thus during forward braking, due to the differential action of the pistons and the equal action of the return springs, the shoes remain continuously anchored instead of leaving the anchors and then coming back with a shock under load.

During reverse braking, the action is the same until the shoes engage the drum, whereupon the shoes shift to the opposite anchors under the influence of drum friction, the liquid-filled cylinders serving in a manner analogous to door checks to slow up the shifting and minimize shock, while at the same time the work of applying the brake is shifted to the smaller pistons 30.

For emergency application by the usual hand lever, especially when the brakes are on the rear wheels, the brake may have a pair of mechanical applying devices such as floating levers or cams 36 notched out to clear the anchors 18 and 20 and having thrust projections 38 extending at right angles therefrom between the ends of the shoes, the bodies of the levers being arranged between the backing plate and the web of shoe 14.

Levers 36 are operated by means such as a tension element or cable 40 connecting their upper ends and operated by a second cable 42 or the like secured approximately at its center. Cable 42 extends at right angles to the brake, through a tubular projection 44 integrally drawn in the backing plate and against the end of which engages and reacts the end of a flexible Bowden-type conduit 46 housing that part of cable 42 which is outside the backing plate.

In effect the drum 10 and backing plate 12 form a closed brake chamber housing the movable parts, and conduit 46 forms a flexible extension of the brake chamber housing the operating cable 42 or its equivalent. The other end of conduit 46 is in most cases secured to the chassis frame, and the cable 42 issues therefrom and is secured to any desired type of connection from the hand lever.

The shoes 14 and 16 may be held yieldingly in place by any suitable spring steady rests 48. The pistons are shown acting on the shoes through piston rods 50 rounded at their piston-engaging inner ends and slotted at their outer ends to embrace shoulders formed on the webs of the shoes.

In operation, the application of force either through the hydraulic actuators or the mechanical applying means results in separating the shoes in the manner described above, and thereby applying the brake. It will be appreciated that, if desired, the hydraulic actuators may be omitted and the mechanical applying means connected to the service pedal, or to both the pedal and the emergency hand lever.

While one illustrative embodiment has been described in detail, it is not my intention to limit the scope of the invention to that particular embodiment, or otherwise than by the terms of the appended claims. This application is a division of my application No. 532,265, filed April 23, 1931.

I claim:

1. A brake comprising a pair of shoes, a pair of fluid-pressure applying devices one adjacent and acting on each pair of shoe ends, a pair of mechanical-pressure applying devices one adjacent and acting on each pair of shoe ends, and means for applying balanced forces to said mechanical-pressure applying devices.

2. A brake comprising a pair of shoes, a pair of fluid-pressure applying devices one adjacent and acting on each pair of shoe ends, and a pair of floating cam levers one adjacent and acting on each pair of shoe ends.

3. A brake comprising a pair of shoes, a pair of anchorages one at each pair of shoe ends, a pair of floating applying levers one acting on each of said pairs of shoe ends, and an operating control constructed and arranged to apply balanced forces to said levers to rock both levers to apply the brake.

4. A brake comprising a backing plate and a pair of shoes, a pair of anchorages one at each pair of shoe ends, a pair of floating applying levers on the same side of the backing plate as the shoes and one acting on each of said pairs of shoe ends, and an operating control passing through the backing plate and having on the same side of the plate as said shoes shiftable means for applying balanced pressures to said levers and arranged to rock both levers to apply the brake.

5. A brake comprising a backing plate and a pair of shoes, a pair of anchorages one at each pair of shoe ends, a pair of floating applying levers on the same side of the backing plate as the shoes and one acting on each of said pairs of shoe ends, a tension element connecting the levers, and another tension element passing through the backing plate and connected to the first tension element and arranged to flex it crosswise to rock both levers to apply the brake.

6. A brake comprising a backing plate and a pair of shoes, a pair of anchorages one at each pair of shoe ends, a pair of floating applying levers on the same side of the backing plate as the shoes and one acting on each of said pairs of shoe ends, a tension element connecting the levers, another tension element passing through the backing plate and connected to the first tension element and arranged to flex it crosswise to rock both levers to apply the brake, and a flexible conduit reacting against the backing plate and housing the second tension element outside the backing plate.

7. A control for a brake which includes a backing plate, comprising a lever at each side of the backing plate, a tension element connecting the levers, and another tension element passing through the backing plate and connected to the first tension element.

8. A control for a brake, comprising a lever at each side of the brake, a flexible tension element connecting the levers, and another tension element connected to the first tension element, and arranged substantially at right angles thereto, and arranged to flex it to apply the brake.

9. A control for a brake which includes a backing plate, comprising a lever at each side of the backing plate, a tension element connecting the levers, and another tension element passing through the backing plate and connected to the first tension element and the part of which other tension element outside the brake is housed in a flexible conduit reacting against the backing plate.

10. A brake comprising a drum and a backing plate forming a substantially closed brake chamber, a pair of individually shiftable shoes in said chamber, a pair of anchors in said chamber mounted on the backing plate and respectively arranged between the corresponding ends of the shoes, an operating lever within the chamber corresponding and adjacent to each anchor and acting on each pair of shoe ends, connecting means between said levers also arranged in said chamber and including a part extending across the upper part of the drum and which exerts a balanced pressure on said levers, and means operable from outside said chamber and acting on the connecting means to apply the brake.

11. A brake comprising, in combination with a drum, a pair of individually shiftable shoes, a pair of anchors respectively arranged between the corresponding ends of the shoes, an operating lever corresponding and adjacent to each anchor and acting on each pair of shoe ends, connecting means between said levers including a part extending across the upper part of the drum and which exerts a balanced pressure on said levers, and applying means acting on the connecting means to apply the brake.

12. A brake comprising a drum and a backing plate forming a substantially closed brake chamber, a pair of individually shiftable shoes in said chamber, a pair of anchors in said chamber mounted on the backing plate and respectively arranged between the corresponding ends of the shoes, an operating lever within the chamber corresponding and adjacent to each anchor and acting on each pair of shoe ends and each of which levers has a clearance opening permitting it to shift relatively to its anchor as the shoes shift their anchorage and each of which has a pair of spaced thrust lugs projecting between the shoe ends on opposite sides of its anchor, connecting means between said levers also arranged in said chamber and including a part extending across the upper part of the drum and which exerts a balanced pressure on said levers, and means operable from outside said chamber and acting on the connecting means to apply the brake.

13. A brake comprising, in combination with a drum, a pair of individually shiftable shoes, a pair of anchors respectively arranged between the corresponding ends of the shoes, an operating lever corresponding and adjacent to each anchor and acting on each pair of shoe ends and each of which levers has a clearance opening permitting it to shift relatively to its anchor as the shoes shift their anchorage and each of which has a pair of spaced thrust lugs projecting between the shoe ends on opposite sides of its anchor, connecting means between said levers including a part extending across the upper part of the drum and which exerts a balanced pressure on said levers, and applying means acting on the connecting means to apply the brake.

14. A brake comprising a drum and a backing plate forming a substantially closed brake chamber, a pair of individually shiftable shoes in said chamber, a pair of anchors in said chamber mounted on the backing plate and respectively arranged between the corresponding ends of the shoes, an operating lever within the chamber corresponding and adjacent to each anchor and acting on each pair of shoe ends, each of which levers has a pair of spaced thrust lugs projecting between the shoe ends on opposite sides of its anchor, connecting means between said levers also arranged in said chamber and including a part extending across the upper part of the drum and which exerts a balanced pressure on said levers, and means operable from outside said chamber and acting on the connecting means to apply the brake.

15. A brake comprising, in combination with a drum, a pair of individually shiftable shoes, a pair of anchors respectively arranged between the corresponding ends of the shoes, an operating lever corresponding and adjacent to each anchor and acting on each pair of shoe ends, each of which levers has a pair of spaced thrust lugs projecting between the shoe ends on opposite sides of its anchor, connecting means between said levers including a part extending across the upper part of the drum and which exerts a balanced pressure on said levers, and applying means acting on the connecting means to apply the brake.

16. A brake having two anchors across the brake from each other, two floating shoes having said anchors between their ends at opposite sides of the brake, two levers adjacent said anchors and each having thrust lugs projecting between the corresponding ends of the shoes inside and outside of the corresponding anchor and means for operating said levers.

17. A brake having two anchors across the brake from each other, two floating shoes having said anchors between their ends at opposite sides of the brake, two levers adjacent said anchors and each having thrust lugs projecting between the corresponding ends of the shoes at opposite sides of the corresponding anchor, mechanical connections between said levers extending across the brake, and applying means for the brake acting on said connections approximately adjacent the center of one of the shoes.

18. A brake having two anchors across the brake from each other, two floating shoes having said anchors between their ends at opposite sides of the brake, two levers adjacent said anchors and each having thrust lugs projecting between the corresponding ends of the shoes at opposite sides of the corresponding anchor, mechanical connections between said levers arranged to shift to balance the forces acting on said levers, and applying means for the brake acting on said connections approximately midway between the levers.

19. A brake having two anchors across the brake from each other, two floating shoes having said anchors between their ends at opposite sides of the brake, two levers adjacent said anchors and each having thrust lugs projecting between the corresponding ends of the shoes at opposite sides of the corresponding anchor, mechanical connections between said levers arranged to shift to balance the forces acting on said levers, and applying means for the brake acting on said connections.

20. A brake comprising a pair of anchor posts at opposite sides of the brake, a pair of shoes having said posts between their opposite pairs of ends, two applying devices arranged respectively adjacent the anchor posts and each having thrust means acting on the corresponding shoe ends on opposite sides of the corresponding anchor and each having associated therewith a part extending approximately perpendicular to the brake diameter passing through said anchors, said parts extending substantially parallel to each other toward the same side of the brake, a balanced-force transmitting connection between said parts, and applying means acting on said connection.

21. A brake comprising a pair of anchor posts at opposite sides of the brake, a pair of shoes having said posts between their opposite pairs of ends, two applying devices arranged respectively adjacent the anchor posts and each having thrust means acting on the corresponding shoe ends on opposite sides of the corresponding anchor and each having associated therewith a part extending approximately perpendicular to the brake diameter passing through said anchors, said parts extending substantially parallel to each other toward the same side of the brake, and applying means acting on said parts.

22. A brake comprising a drum, a pair of separate floating brake shoes in said drum, each arranged to anchor on opposite ends depending on the direction of rotation of said drum, a pair of anchors interposed between the adjacent ends of said shoes, a pair of floating actuating levers formed with openings permitting the levers to float with respect to said anchors and having thrust parts interposed between adjacent ends of said shoes, and common means for operating said actuating levers.

23. In mechanism of the class described, the combination of a brake drum, a pair of brake shoes for engagement therewith, a pair of pivotal supports for said shoes, means for moving said shoes about said pivotal supports, and cam mechanism for moving one of said shoes from engagement with its pivotal support and into engagement with said drum independently of said means.

24. A brake comprising a drum, a support, a pair of brake shoes mounted on said support, a hydraulic cylinder connected with one of the ends of each shoe, a floating lever connected with the opposite ends of the shoes, means connected to the lever for actuating it, resilient means for returning said shoes from the drum, and stops associated with both ends of said shoes.

25. A brake comprising a drum, a support, a pair of brake shoes mounted on said support, a hydraulic cylinder connected with one of the ends of each shoe, a lever connected with the opposite ends of the shoes, means connected to the lever for actuating it, resilient means for returning said shoes from the drum, and stops associated with both ends of said shoes.

26. A brake comprising a drum, a support, a pair of brake shoes mounted on said support, a fluid cylinder connected with one of the ends of each shoe, a lever connected with the opposite ends of the shoes, means connected to the lever for actuating it, resilient means for returning said shoes from the drum, and stops associated with both ends of the shoes.

27. A brake comprising a brake drum, a support, brake shoes adapted to be moved into engagement with said drum, a pair of motors each of which is mounted on said support and each of which is arranged between and acting on both of said shoes, a pair of anchors each located at one side of one of said motors, additional means for applying said shoes, and a pair of springs both interconnecting both of said shoes.

28. A brake comprising a pair of brake shoes and substantially tangentially floating load applying means between each pair of adjacent ends of said shoes, and anchor means for the shoes upon which anchor means the load applying means floats.

29. A brake comprising a pair of brake shoes and substantially tangentially floating load applying means between each pair of adjacent ends of said shoes, and anchor means for the shoes upon which anchor the load applying means floats, said anchor means coacting with means at the adjacent ends of said shoes to center the shoes when the brake is in inoperative position.

LUDGER E. LA BRIE.